Aug. 19, 1930.  A. M. LANE  1,773,535
AUTOMATIC TRANSMISSION
Filed March 20, 1929  4 Sheets-Sheet 1

Fig. 1.

INVENTOR.
*A. M. LANE.*
BY
ATTORNEY.

Aug. 19, 1930.  A. M. LANE  1,773,535
AUTOMATIC TRANSMISSION
Filed March 20, 1929   4 Sheets-Sheet 2

INVENTOR.
A. M. LANE.
BY
ATTORNEY.

INVENTOR.
A. M. LANE.

Aug. 19, 1930.        A. M. LANE        1,773,535
AUTOMATIC TRANSMISSION
Filed March 20, 1929    4 Sheets-Sheet 4

INVENTOR.
A. M. LANE.
BY
ATTORNEY.

Patented Aug. 19, 1930

1,773,535

UNITED STATES PATENT OFFICE

ALBERT M. LANE, OF ROCKFORD, ILLINOIS, ASSIGNOR TO AUTOMATIC TRANSMISSION COMPANY, OF ROCKFORD, ILLINOIS, A CORPORATION OF ILLINOIS

AUTOMATIC TRANSMISSION

Application filed March 20, 1929. Serial No. 348,383.

The present invention relates in general to power transmissions and has particular reference to an improved change speed mechanism for connecting driving and driven elements in automatically variable driving ratios.

The invention has for its object to provide a mechanism of the class described which will efficiently perform in its intended capacity and which will lend itself to unusual advantage in connection with motor vehicles as a means for eliminating the manual manipulation of the speed changing mechanism as at present employed in all motor vehicles which are powered by internal combustion engines.

Other objects of the invention will appear hereinafter, the novel features and combinations being set forth in the subjoined claims.

For the purpose of illustrating the invention and explaining the construction and operation thereof and especially since the mechanism has been provided primarily for use in connection with motor vehicles, I have elected to show and describe a form of the invention which lends itself unusually well to motor vehicle assemblies. I wish it to be understood, however, that the invention is not necessarily limited to this particular use as it may well find expression in a speed changing mechanism for other power transmissions, wherein it is desirable to effect an automatically variable driving ratio between a driving element and an element to be driven.

In the accompanying drawings which show the form of the invention above mentioned.

Referring now to the drawings in detail: 1 represents an engine shaft and it may be assumed that the same is connected with the prime mover such as an internal combustion engine with which a motor vehicle is powered. The shaft 1, as is customary in conventional types of motor vehicles, is connected in driving relation with one part of a clutch 2 and the clutch shaft 3 is connected in driving relation with another part of the clutch 2. For the purpose of the present description the clutch 2 may be considered as any well known type of manually operable clutch as at present employed for motor vehicles or it may be an automatic clutch of the type shown and described in the co-pending application of Kenneth E. Lyman, Serial No. 317,156. The clutch 2 is inclosed within a bell-housing 4 and the housing is made with an end wall 5 to which the transmission case 6 is secured by means of bolts or the like 7. The wall 5 of the bell-housing 4 constitutes an end wall of the transmission case 6 and it is made with a centralized opening equipped with a ball bearing 8 through which the clutch shaft 3 extends into the transmission case, an oil retainer 9 being employed to cooperate with a collar 10 threaded on the clutch shaft to close the opening in the wall 5 against escape of lubricant contained in the case 6. This lubricant seal is also fortified by a bushing 11 which has an apron overlapping the ball race on the inside of the case 6.

Attention is called to the fact that the clutch shaft 3 is extended rearwardly in the direction of the drive to provide an extended sleeve 12 for the primary sun gear 13 which is formed on the sleeve 12 as an integral part thereof adjacent its termination. The sun gear sleeve 12, as it will now be hereinafter further described, provides an internal bore for the reception of the driven shaft 14 which may be considered as the driven element of the mechanism. The shaft 14 enters the transmission case 6 through an opening 15 in the rear wall 16 thereof, the opening 15 being equipped with an anti-friction bearing assembly 17 and a suitable oil retainer in the form of a flange 18 which is formed as a part of a bracket 19 which carries the speedometer take-off 20 and adjacent is mounted the brake drum 21 which contributes to a parking or emergency brake for the vehicle. The propeller shaft is connected as at 22. The driven shaft 14 extends forwardly in the internal bore provided by the sun gear sleeve 12 and suitable bushings 23 and 24 are provided therein, and the reduced diameter on the end of the shaft 14 which serves as a pilot 25 is supported at the termination of the internal bore by means of an anti-friction bearing 26. With this assembly the shafts 3 and 14 are mounted with freedom of relative angular movement or rotation when occasion demands.

Meshing constantly with the primary sun gear 13 are a plurality of planet gears 27 which in turn are in constant mesh with a primary ring gear 28.

The primary ring gear 28 is riveted or otherwise secured as at 30 to a plate 31 which is also riveted or otherwise secured as at 32 to a radial flange 33 on a sleeve 34 which is journaled on an enlarged diameter 35 on the driven shaft 14, suitable bushings 36 being employed for the sleeve and the shaft. Also riveted or otherwise suitably secured as at 37 to the side of the plate 31 is a ratchet device 38 made in the form of a wheel or disc. The purpose of this ratchet device on the primary ring gear plate 31 will be hereinafter more specifically referred to.

The planet gears are journaled on planet shafts 39 with intervening bushings 40 and the shafts are carried or supported on one side of the planet gears by means of one part 41 of a two part carrier or spider in which the ends of the shafts are fixed. This part 41 of the planet carrier is riveted or otherwise secured as at 42 to a radial flange 43 or shoulder which is either formed as an integral part of the driven shaft 14 or fixed thereon to serve as an integral part thereof. It will thus be seen that the part 41 of the planet carrier is fixed in driving relation with the driven shaft and in this connection it should be remembered that the power take-off from the mechanism to the driven shaft is through this two part carrier and this is true for both forward and reverse speeds. The other part of the planet carrier for the planet gears 27 comprises a plate or the like 44 to which is spot welded or otherwise secured a journal bearing 45 for the opposite ends of the planet shaft 39 and this plate 44 is riveted or otherwise secured as at 46 to a flange or shoulder on a sleeve 48 which is journaled upon the sun gear sleeve 12 with an intervening bushing 49.

It will be noticed that the bushings heretofore mentioned and those to be hereinafter mentioned are all made with upturned flanges to serve as thrust spacers or else washers are used in the same capacity to account for end thrusts in the mechanism. The plate 44 cooperates with the plate 41 to provide a primary planet carrier for the primary planet gears 27.

The plate 44 also serves in a capacity of a combined planet carrier and ring gear in that it is made with a forwardly presented integral drum like part 50 in which the secondary ring gear 51 is spot welded or otherwise fixed. This secondary ring gear 51 is made with internal teeth like the primary ring gear 28 and these teeth are in constant mesh with a plurality of secondary planet gears 52. These secondary planet gears are in turn also in constant mesh with a secondary sun gear 53 which is splined as at 54 on the sun gear sleeve 12. It will thus be seen that the drive for both forward and reverse speeds is taken in off the primary and secondary sun gears 13 and 53, respectively. In other words, it is a double sun gear drive and a spider or planet carrier take-off, the secondary ring gear 51, as previously stated, being fixed in driving relation with the spider of the primary system or primary gear train.

It will also be seen that the mechanism comprises a primary and secondary planetary system or a primary and secondary planetary gear train connected in fixed driving relation. The secondary spider or carrier in the secondary system and which carries the secondary planet gears 52 contributes to the reversing mechanism. This secondary planet carrier comprises a plate 55 which is disposed on one side of the planet gears 52 being riveted or otherwise secured as at 56 to a radial flange or shoulder on a sleeve 57 which is journaled on the sun gear sleeve 12 with an intervening bushing 58. The sleeve 57 and the sleeve 48 terminate in confronting relation with an intervening washer 59.

Figure 1:
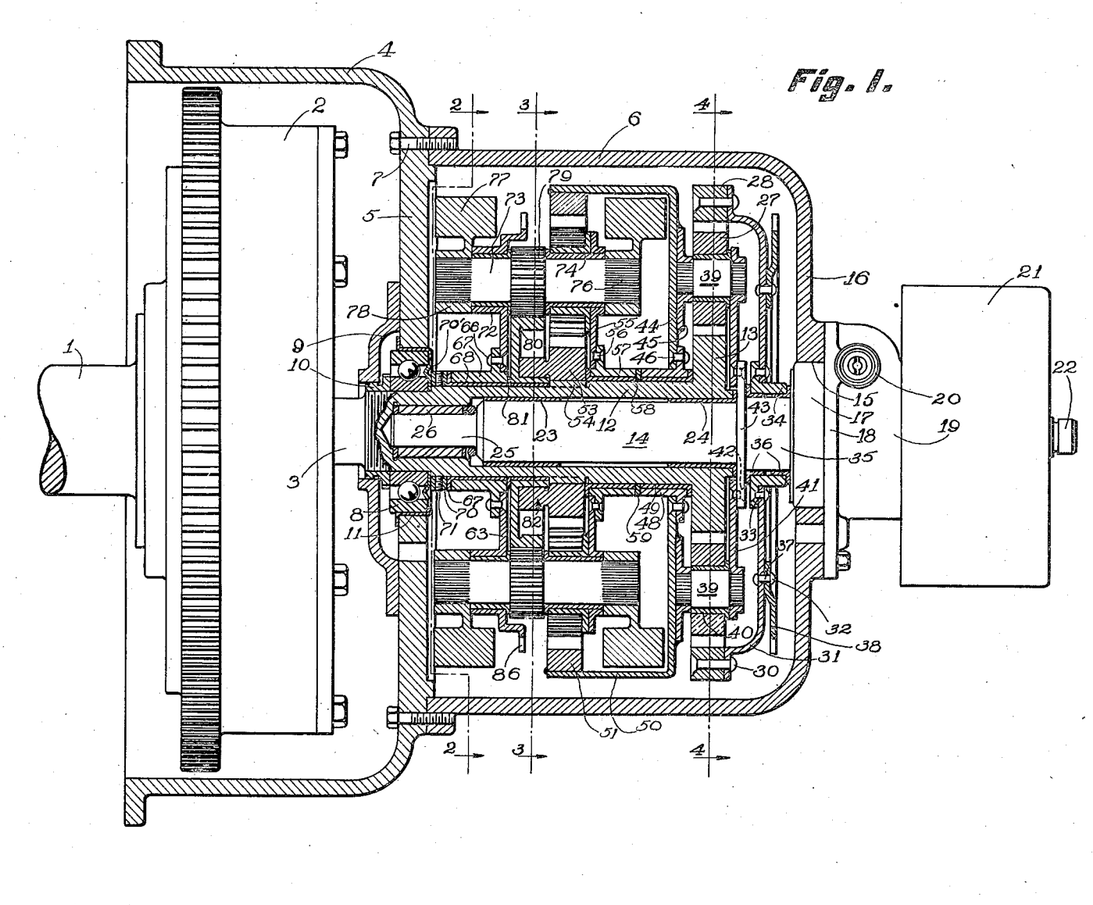
Fig. 1 is a longitudinal section of a mechanism constructed in accordance with my invention and with certain of the transmission parts with which the invention is used in combination shown in elevation.
Figure 3:
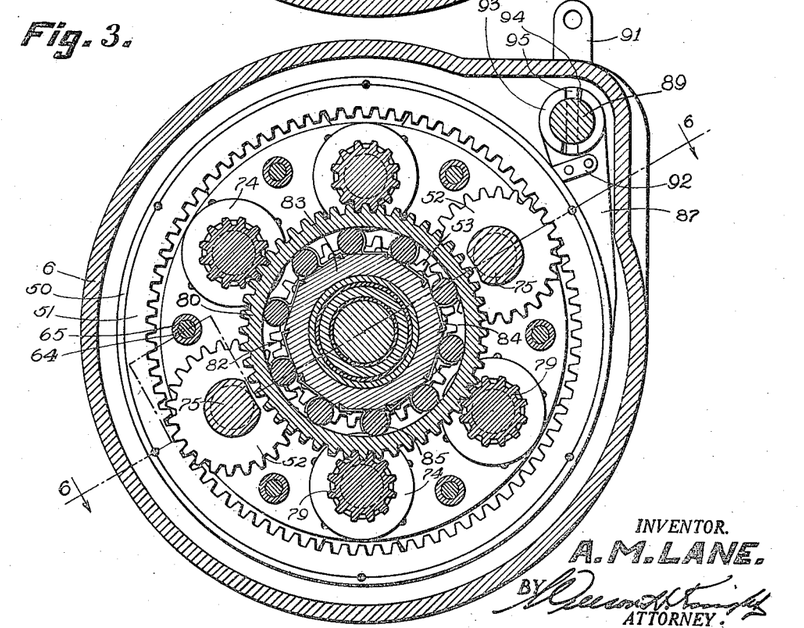
Fig. 3 is a view in cross section on the line 3—3, Fig. 1.
Figure 6:
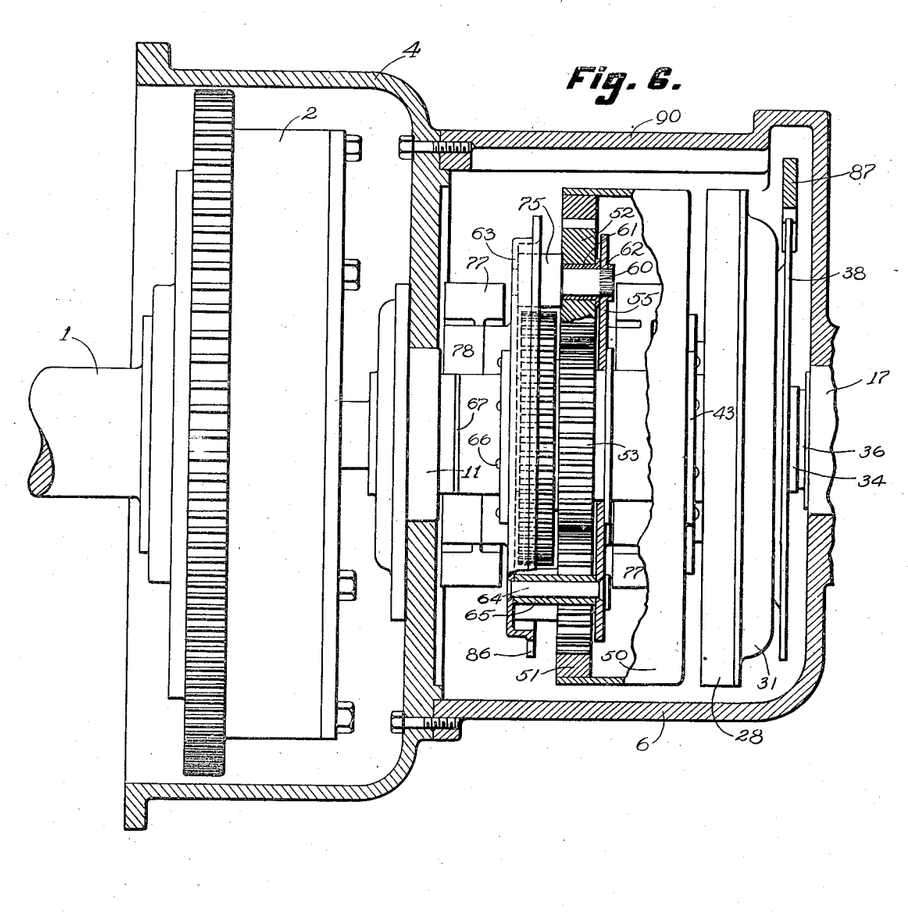

The secondary planet gears 52 do not show in Fig. 1 but are clearly illustrated in Figs. 3 and 6. As are shown in these figures they are journaled on the secondary planet shafts 60 with intervening bushings 61. The secondary planet shafts 60 for the gears 52 are fixed as at 62 in the part 55 of the secondary spider and the opposite ends of the shafts are fixed in the part 63 of the secondary spider or planet carrier which is disposed on the opposite side of the planet gears 52 from that of the plate 55. The two plates 55 and 63 of the secondary spider are properly spaced by spacing rivets or the like 64 upon which the sleeves 65 are carried with the ends of the sleeves abutting against the inside of the plates 55 and 63. It will thus be seen that the secondary planet gears 52 are journaled on the secondary planet shafts 60 and that the shafts 60 are in turn fixed in the secondary spider. Referring further to the construction of the part 63 of the secondary spider, attention is invited to Fig. 1 wherein it will be seen that this plate is riveted or otherwise secured as at 66 to an upstanding flange or shoulder on a sleeve 67 which is journaled on the sun gear sleeve 12 with an intervening bushing 68. The end of this bushing 68 is turned up to provide a flange 69 which abuts against a collar 70 with the collar in turn abutting against the ball bearing assembly 8. The collar is fixed in position by means of a set screw or the like 71. It will be further seen that the part 63 of the secondary spider is made with a journal bearing 72 for supporting one end of the supplemental planet shafts 73. The opposite ends of these supplemental planet shafts are supported in journals 74 which are spot welded or otherwise secured to the inside face of the part 55 of the secondary spider. Both the secondary and supplemental planet shafts are carried by the secondary spider.

Due to the fact that the parts of the secondary spider are spaced considerable distance apart compared to the thickness of the secondary planet gears 52, the secondary planet shafts 60 are long enough to bridge this gap and they are made with an enlarged diameter as at 75 to provide an abutment against the inside face of the part 63 and an abutment for the intervening bushings 61. The circumference of these enlarged diameters 75 are mutilated so as to clear the supplemental sun gear which will be more specifically hereinafter described.

Figure 2:
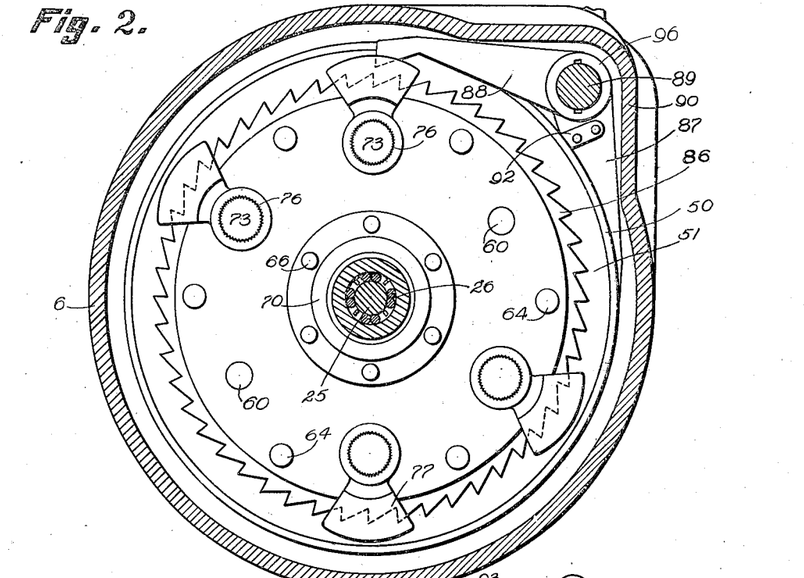
Fig. 2 is a view in cross section on the line 2—2, Fig. 1.

The supplemental planet shafts 73 are as previously stated journaled in the secondary spider or planet carrier and project from opposite sides thereof with their projecting ends splined as at 76 and on which the centrifugal weights 77 are mounted. As shown in Fig. 2, there are preferably four pairs of these weights each of which having a collar 78 for mounting upon the splined ends of the shafts 73 for eccentric rotation in fixed relation with the shafts. Also splined or otherwise fixed on the supplemental shafts 73 are supplemental planet gears 79, the same meshing with the aforesaid supplemental sun gear 80 which in turn is journaled on the sun gear sleeve 12 with an intervening bushing provided by the continuation of the bushing 68, a spacing washer 81 being employed between the part 63 of the secondary spider and the supplemental sun gear 80. The supplemental sun gear 80 is mounted co-axial with the secondary sun gear 53 and these two gears are connected through means of a one-way clutching mechanism generally represented as at 82 in Fig. 1 and more specifically shown in Fig. 3.

Any suitable one-way clutching mechanism may be employed that will serve the intended purpose, the one shown comprises a radial projection 83 on the secondary sun gear 53 projecting into an open sided space 84 made to receive it in the supplemental space 80. The male part 83 which is formed as an integral part of the secondary sun gear 53 is made with a plurality of tangential flat surfaces on which are supported rollers 85 which occupy the space 84 and contact with the cylindrical surface on the inside of the supplemental sun gear. Suitable spring retainers are provided for each of the rollers to hold them in alignment. For a more complete detailed description of this overrunning clutch construction reference is made to a co-pending application, Serial No. 337,150, filed February 2, 1929, by Kenneth E. Lyman and assigned to the assignee in this case.

Figure 5:
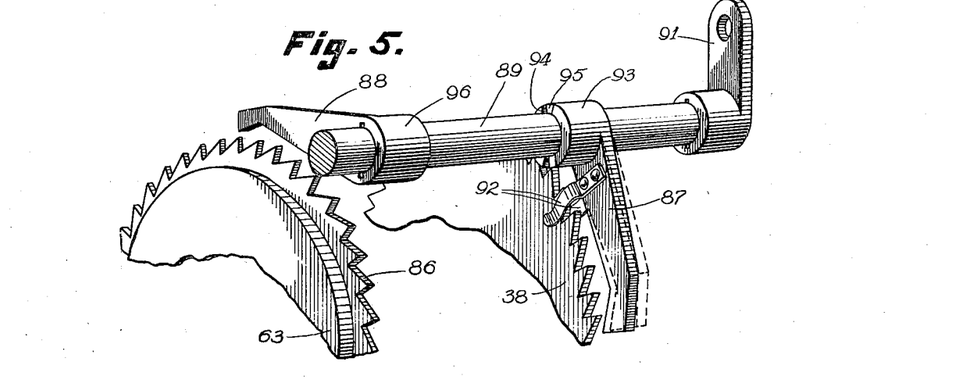
Fig. 5 is a detail perspective view of a combined manually operable reversing device and an automatic control for one of the elements of the mechanism and Fig. 6 is a detail view in section taken on the line 6—6, Fig. 3.

The part 63 of the secondary spider or planet carrier, aside from performing as a spider part, also serves in the further capacity of a ratchet wheel. The same in this connection contributes to a pawl and ratchet mechanism which is used as a convenient back-stop for arresting the rotation of the spider in one direction while permitting its unrestrained rotation in an opposite direction. In order that this part 63 of the secondary spider may serve as a ratchet wheel for the purpose described, the peripheral edge thereof is provided with ratchet teeth 86. It will be remembered that rotation of the primary ring gear 28 is also controlled by a ratchet device and upon reference to Fig. 5, it will be seen that the pawls 87 and 88 which control the primary ring gear 28 and the secondary spider respectively are mounted upon a shaft 89 which is common to both. This shaft, as best illustrated in Figs. 2 and 3, extends longitudinally of the mechanism within an off-set 90 of the case 6 and projects through one end of the case where it is equipped with a link 91 or other connection suitable for the purpose so that a manually controlled lever mechanism or the like may be connected with the shaft 89 for manually determining the position of the pawls with respect to the respective ratchet wheels when occasion demands.

Figure 4:
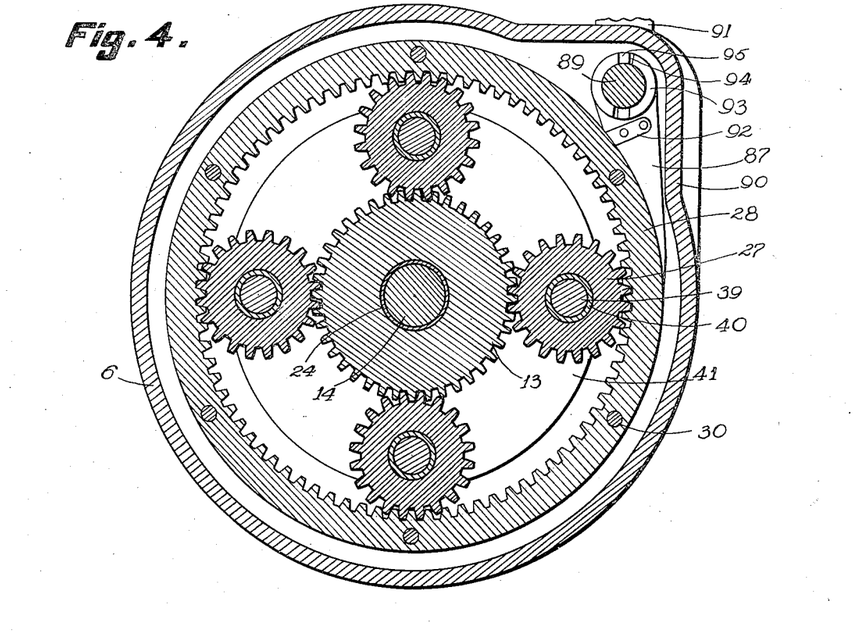
Fig. 4 is a view in cross section on the line 4—4, Fig. 1.

Considering that power from a prime mover such as an internal combustion engine is delivered to the shaft 1 through the clutch 2 to the clutch shaft 3 and the direction of the drive is clockwise, viewed from Figs. 2, 3 and 4, the drive will be taken into the mechanism from the primary and secondary sun gears and with the pawl 87 engaging the teeth on the periphery of the plate 38 the primary ring gear 28 will be held against anticlockwise rotation. The primary spider which carries the primary planet gears 27 moves forward or in a clockwise direction at a reduced speed. Since the secondary ring gear 51 is fixed to rotate with the primary spider and since the primary spider is connected to the driven shaft 14, the speed of rotation of the secondary ring gear corresponds to that of the driven shaft and the rotation is in the same direction. Since the drive as stated is also taken in through the secondary sun gear 53, it also rotates forward or in a clockwise direction but at a speed greater than that of the secondary ring gear. Since the secondary planet gears mesh with the secondary ring gear and since they are carried by the secondary spider, the secondary spider also rotates in a clockwise direction. Rotation of the secondary spider makes the centrifugal weights effective and their effectiveness is transmitted into the secondary system through the overrunning clutch which connects the secondary and supplemental sun gears. In other words, the supplemental planet shafts 73 on which the weights are splined also carries the supplemental planet gears 79 which mesh with the supplemental sun gear. The effectiveness of the weights is influenced by the speed of the driving element, the sun gear sleeve 12 as an example which is the same as the clutch shaft 3 and the load resistance also is a determining factor in the control of the effectiveness of the weights.

It will be appreciated that if the primary ring gear 28 were free to float in an anti-clockwise direction and with the primary spider fixed to the load, the tendency would be for the primary ring gear to rotate backwards or in an anti-clockwise direction but with the ratchet mechanism holding it against rotation in this direction, the drive is transmitted to the driven shaft and the drive is taken into the secondary system on two diameters, namely the secondary ring gear 51 and the secondary sun gear 53. The arrangement and the cooperative relationship of the assembly enables the load to be moved in a pre-determined fixed gear ratio. As the resistance of the load decreases and the weights become more effective, the rate of planetation of the primary planet gears will be influenced by the effectiveness of the weights and the gear ratio automatically changes and gradually approaches a one to one drive and goes into a one to one drive when the driving torque is balanced or substantially balanced with the load resistance.

The purpose of the overrunning clutch connection between the primary and supplemental sun gears is to eliminate the accelerating effect of the weights when they are moved outwardly throughout 180° or approximately 180° of their cycle of rotation. When they are moving outwardly, the overrunning clutch automatically releases the supplemental sun gear from the secondary sun gear so that there is no motion transmitted from the supplemental system to the secondary system but just as soon as the weights begin to move inwardly, the overrunning clutch becomes immediately effective and the forces developed by the weights are transmitted through the secondary system to the primary system for the purpose desired.

That is to say, the weights control the effective planetation of the two systems with the result that the variable driving ratios are automatically attained to compensate for the difference in torque balance between the driving shaft and the driven shaft. Attention is again called to the fact that the drive is taken into the secondary system on two diameters, namely the ring gear 51 and the sun gear 53. This of course effects the planetation not only in the secondary system but in the primary system and makes the two systems unusually susceptible and responsive to the controlling forces of the weights. As a result lighter weights may be used than would be necessary were it not for the cooperative function of the assembly.

The pawl and ratchet mechanism for holding the primary ring gear 28 against rotation in a reverse direction operates automatically in that the pawl 87 is equipped with a pair of spring devices in the form of fingers 92 which project in advance of the pawl and straddle the plate 38 and engage the opposite sides of the same with sufficient tension so that when the plate tends to move in an anti-clockwise direction, the fingers will pull the pawl into engagement with the ratchet teeth and the rotation of the plate in an anti-clockwise direction will be prevented. As soon as the mechanism goes into a one to one drive, the primary ring gear then moves forward or in a clockwise direction whereupon wiping contact of the fingers on the sides of the plate will impart a thrust to the pawl and hold it out of contact with the teeth so that a silent ratchet mechanism is thus provided. This silent ratchet mechanism is described and claimed in the co-pending application filed February 21, 1929, by Kenneth E. Lyman, Serial No. 341,599 and assigned to the same assignee as is this case. It is of course understood, however, that any other ratchet mechanism will serve the purpose but since a silent operating device is preferable, I have elected to show such a device which forms the subject matter of a co-pending application of the same assignee as in the present case.

It will thus be observed that the pawl 87 is under the automatic control of these friction fingers 92. However, it is also under the control of the operator in that the collar 93 is keyed to the shaft 89 by means of the pin 84 or in any other manner suitable for the purpose so that when the shaft is rocked in one direction, the pawl 87 will be held in a neutral position where the action of the spring fingers 92 is restrained and the pawl cannot automatically move in response to the action of the fingers in either direction. Although as stated the collar 93 of the pawl 87 is keyed to the shaft 89, the oversize slots or openings 95 which the pin 94 occupies provide for a limited movement of the pawl independently of the shaft 89 when the pawl is in a position to be automatically responsive to the action of the fingers which of course will be at forward speeds. When the shaft 89 is rocked by the operator to put the mechanism in neutral, the pawl 88 is of course held out of contact with the teeth 86 on the part 63 of the secondary spider. In fact, the collar 96 of the pawl 88 is keyed or otherwise secured on the shaft 89 at such an angle that the pawl will always be out of contact with the teeth 86 until the operator deliberately rocks the shaft to position the pawl in engagement with the teeth 86 and when such is the case, the mechanism will be reversed because the secondary spider will be held against forward or clockwise rotation and the primary ring gear will be free to float in an anti-clockwise direction. Thus, it will be seen that to reverse the mechanism it will only be necessary to rock the shaft 89 to arrest forward rotation of the secondary spider and allow for backward or anti-clockwise rotation of the primary ring gear.

Referring further to the operation of the mechanism, it will be seen that the power comes into the transmission from the clutch shaft 3 through the sleeve 12 to the sun gears 53 and 13, the sun gear 13 in the primary planet system effecting the rotation of the gear 27 in such a manner as to fulcrum on the ring gear 28 and put a forward thrust in a clockwise direction on the planet shaft 39 which, being mounted fixedly in the primary planet carrier, comprising the parts 44 and 41, causes a clockwise rotation of the spider. The ring gear 51, being riveted or otherwise fastened to the drum section 50 of the primary planet carrier is rotated in a clockwise direction at the same speed as the primary planet carrier. The primary planet carrier and the ring gear 51 are carried forward in a ratio of one rotation to every three rotations of the sun gear 13 by reason of design.

The power coming in on the sun gear 53 is applied to the planet gears 52, journaled on the planet shafts 75 which are fixed in the secondary planet carrier. This transposition of power causes a rotation of the planet gears 52 in a counter clockwise direction. However, the gearing is so arranged that the sun gear tends to drive the planet gear 52 at a speed 1½ times that of itself, whereas the ring gear 51 is driven in a clockwise direction at ⅓ the speed of the sun gear 53. This drive is imparted to the ring gear by the primary planet carrier because it is integral with them. Whenever the ring gear 51 is held against backward rotation or is being driven in a forward direction, it follows that the planet gears 52 fulcrum on its teeth and cause a forward pressure to be exerted on the planet shafts 75, resulting in a clockwise drive being imposed on the secondary planet carrier to which the planet shafts are fixed. Although the ring gear 51 is driven forward rather than standing still the relative rotation between the ring gear and the secondary planet carrier is the same as if it were stationary but the relative rotation between the sun gear and the secondary planet carrier is increased. That is to say the rotation of the secondary planet carrier is the result of the natural planetation effected by the planet gears 52 plus the forward carriage of the ring gear 51. This increase in the speed of rotation of the planet carriers is beneficial in that it increases the speed of the member of influencing generation of centrifugal force, with which it is proposed to change the speed ratio of the driving shaft to the driven shaft from the initial three to one to a one to one drive.

This increase in speed of the planet carriers effects an increased value in power of the weights which could not otherwise be obtained without a loss in torque value. With the same effective torque ratio present in the planet system the speed of the secondary planet carrier is increased to where it rotates six tenths of one revolution for every revolution of the sun gear 53, an increase in speed of 100 per cent over the straight planetary type. The value of this increase in speed may be realized when it is considered that the effective centrifugal force is a product of the square of the speed. The secondary planet carrier speed having been increased by two, the effective centrifugal force is increased by four.

The weights 77 are fixedly mounted to the planet gears 79 through the planet shafts 73, journaled in the planet carriers 55 and 63, planet gears 79 through the planet shafts 73, supplemental sun gear 80, journaled on the driving sleeve 12. The supplemental sun gear 80 is mounted through a one-way clutching means for unitary rotation with sun gear 53 when a retarding force is applied to it. This retarding force is centrifugal in nature and generated in the weights 77 through rotation of the secondary planet carrier about the driving sleeve 12 and tends to hold the weights in an outward radial position relative to the driving sleeve 12. When this force is acting on the weights, it is felt on the supplemental sun gear 80 through the gear 79 in a form of resistance rotation. This resistance to rotation being the retarding force which causes the supplemental sun gear 80 to be engaged, through the over-running clutch, in a unit connection with the sun gear 53, resulting in the weights being pulled in toward the center against centrifugal force. This force is felt in an opposite direction to that imposed upon the gear 53 by the driving sleeve 12 and taken off through the planet gears 52, a reversal of tooth pressure on the ring gear being set up, and a forward thrust applied to it; the forward thrust increasing the speed of rotation of the ring gear 51 and its associate members, which includes the driven shaft and the load.

When the weight has reached its innermost position, centrifugal force acts upon it so rapidly as to cause the supplemental sun gear to release the one-way clutching means and run ahead of the sun gear 52, releasing it of any accelerating forces which might otherwise be applied. The increase in the forward speed of the ring gear 51 necessarily creates an increase in the speed of rotation of the secondary system and, this, together with the increased speed of the driving shaft, forces the process to repeat until the speed of the ring gear 51 is substantially the same as that of the sun gear, 53, whence a one to one drive will have been established. The primary ring gear tends to float in a clockwise direction and disengage the back stop mechanism at all times after the speed ratio between the driving and driven elements has been raised above three to one.

Reverse is effected through the manual engagement of the pawl 88 in the ratchet teeth 86 of the planet carrier 63 and disengagement of the pawl 87 from the ratch plate 38 of the primary ring gear housing. When this operation is completed, power put into the driving sleeve 12 through the driving shaft 3, passes into the primary system through the sun gear 3 to the planet gear 27 causing a backward rotation of the ring gear 28 which is entirely floating so that no effect will be felt in the secondary system. Power applied by the driving sleeve 12 to the sun gear 53 is put into the planet gear 52, meshing with the ring gear 51, tending to drive it in a counter clockwise direction so that backward force is felt through all of its members, including the driven shaft and the load. No planetation can occur because the engagement of the pawl 88 in the ratchet teeth 86 of the planet carrier 63 holds it against rotation, and without rotation of the planet carriers there can be no planetation of the planet gears.

Having thus described and shown an embodiment of my invention, what I claim and desire to secure by Letters Patent of the United States is:

1. In an automatic transmission, driving and driven shafts, planetary change speed mechanism connecting said shafts in variable driving ratios, comprising primary and secondary planetary gear systems, a supplemental planetating gear system, one-way clutching means connecting the supplemental system with the secondary system, centrifugal responsive means in said supplemental system, means for connecting the primary and secondary systems with the driving shaft, a combined planet carrier and ring gear inter-connecting the primary and secondary systems and means connecting said combined planet carrier and ring gear in driving relation with the driven shaft.

2. In a transmission, driving and driven shafts, a planetary change speed mechanism for connecting said shafts in variable driving ratios, comprising primary and secondary planetating gear systems, means for connecting said systems with the driving shaft, a combined ring gear and planet carrier connecting the primary and secondary systems, means for connecting said combined ring gear and planet carrier with the driven shaft and means for automatically changing the speed ratio.

3. In a transmission, driving and driven shafts, planetary change speed mechanism for connecting said shafts in variable driving ratios, comprising a plurality of planetary gear systems, sun gears in said systems, means for connecting a plurality of said sun gears with the driving shaft, means interconnecting said systems, a planet carrier in one of said systems, means for connecting said planet carrier with the driven shaft and means for automatically changing the speed ratio.

4. In a transmission, driving and driven shafts, planetary change speed mechanism connecting said shafts in variable driving ratios, comprising a plurality of interconnected planetary gear systems, sun gears in said systems, means for connecting a plurality of said sun gears with the driving shaft, planet carriers for said systems, means for connecting one of said planet carriers with the driven shaft, a ring gear in one of said systems, means for holding the ring gear against rotation in one direction for establishing a pre-determined gear ratio in the mechanism and means for automatically changing the ratio.

5. In a transmission, driving and driven shafts, change speed mechanism for connecting said shafts in variable driving ratios, comprising a plurality of interconnected planetary gear systems coaxially aligned in the direction of the drive between the driving and driven shafts, sun gears in said systems, means for connecting a plurality of said sun gears with the driving shaft, a planet carrier for one of said systems, means for connecting said planet carrier with the driven shaft, a ring gear for the system in which the planet carrier is connected with the driven shaft, means for holding said ring gear against rotation in one direction for establishing a pre-determined driving ratio between the driving and driven shafts and means for automatically changing the ratio.

6. In a transmission, driving and driven shafts, speed changing mechanism for connecting said shafts in variable driving ratios, comprising front, intermediate and back coaxially mounted and interconnected planetary gear systems, sun gears in said systems, means for connecting the sun gears of the intermediate and back systems with the driving shaft, planet carriers in said systems, means for connecting the planet carrier for the back system with the driven shaft and means coacting with the front system for automatically changing the driving ratio.

7. In a transmission, driving and driven shafts, speed changing mechanism for connecting said shafts in variable driving ratios, comprising front, intermediate and back coaxially mounted and interconnected planetary gear systems, sun gears in the intermediate and back systems, means for connecting the sun gears with the driving shaft, a planet carrier for the back system contributing to a ring gear for the intermediate system, means for connecting said planet carrier with the driven shaft, a ring gear for the back system, means for causing said ring gear to rotate in one direction only for forward speeds, means for reversing the drive in the mechanism and means for automatically changing the gear ratio.

8. In a transmission, driving and driven shafts, a sun gear drive and a planet carrier take-off plural planetary speed changing mechanism connecting said shafts in variable driving ratios, a floating ring gear functioning as an element in said mechanism, means for holding said ring gear against reverse rotation to establish a pre-determined driving ratio in the mechanism, a floating secondary planet carrier, means for holding said secondary planet carrier against rotation in one direction for reversing the drive in the mechanism, means for releasing said floating ring gear for reverse rotation when said secondary planet carrier is held against rotation in one direction and means for automatically changing the ratio.

9. In an automatic transmission, driving and driven shafts, planetary change speed mechanism connecting said shafts in variable driving ratios, comprising in combination, primary and secondary planetary gear systems, a supplemental planetating gear system, one-way clutching means connecting the supplemental system with the secondary system, centrifugal responsive means in said supplemental system, a planet carrier for the supplemental system and secondary system, means for connecting the primary and secondary systems with the driving shaft, a combined planet carrier and ring gear for interconnecting the primary and secondary systems, and connected in driving relation with the driven shaft and through which the driven shaft may be rotated in either direction, a floating ring gear for the primary system and means for holding said ring gear against reverse rotation for establishing a pre-determined driving ratio in the mechanism.

10. In an automatic transmission, driving and driven shafts, planetary change speed mechanism connecting said shafts in variable driving ratios, comprising in combination, primary and secondary planetary gear systems, a supplemental planetating gear system, one-way clutching means connecting the supplemental system with the secondary system, centrifugal responsive means in said supplemental system, a planet carrier for the supplemental system and secondary system, means for connecting the primary and secondary systems with the driving shaft, a combined planet carrier and ring gear for interconnecting the primary and secondary systems, and connected in driving relation with the driven shaft and through which both forward and reverse drives are imparted to the driven shaft, a floating ring gear for the primary system, means for holding said ring gear against reverse rotation for establishing a pre-determined driving ratio in the mechanism, means for holding the planet carrier for the secondary and supplemental systems against rotation in one direction for reversing the drive in the mechanism, and means for releasing the ring gear in the primary system for reverse rotation when said planet carrier for the secondary and supplemental systems is held against rotation in one direction.

11. In a transmission, driving and driven shafts, speed changing mechanism for connecting said shafts in variable driving ratios, comprising in combination, a plurality of planetary systems, a planet carrier for one of said systems through which both forward and reverse drives are imparted to the driven shaft, a floating ring gear for the system in which the planet carrier is connected with the driven shaft, means for holding said ring gear against rotation in one direction when the drive is forward, means for reversing the drive and means for releasing said floating ring gear for rotation in an opposite direction when the drive is reversed.

12. In a transmission, driving and driven shafts, planetary change speed mechanism for connecting said shafts in variable driving ratios, comprising in combination, a plurality of planetary gear systems, means for connecting certain of said systems with the driving shaft, a planet carrier for one of said systems contributing to a ring gear for another of said systems, said planet carrier being also connected in fixed driving relation with the driven shaft and means for automatically changing the speed ratio.

Signed at Rockford, in the county of Winnebago, and State of Illinois, this 18th day of March, 1929.

ALBERT M. LANE.